United States Patent
Kaneko et al.

(10) Patent No.: US 7,852,374 B2
(45) Date of Patent: Dec. 14, 2010

(54) IMAGE-PICKUP AND ASSOCIATED METHODOLOGY OF DIVIDING AN EXPOSURE-TIME PERIOD INTO A PLURALITY OF EXPOSURES

(75) Inventors: Akihisa Kaneko, Tokyo (JP); Yuko Sonoda, Kanagawa (JP)

(73) Assignee: Sony Corporation, Tokyo (JP)

( * ) Notice: Subject to any disclaimer, the term of this patent is extended or adjusted under 35 U.S.C. 154(b) by 390 days.

(21) Appl. No.: 11/552,183

(22) Filed: Oct. 24, 2006

(65) Prior Publication Data
US 2007/0103562 A1 May 10, 2007

(30) Foreign Application Priority Data
Nov. 4, 2005 (JP) ............... 2005-320822

(51) Int. Cl.
H04N 5/228 (2006.01)
H04N 5/235 (2006.01)

(52) U.S. Cl. ............ 348/208.4; 348/208.6; 348/208.99; 348/221.1

(58) Field of Classification Search ............ 348/208.99, 348/208.1, 221.1, 362, 208.4, 208.6, 208.12
See application file for complete search history.

(56) References Cited

U.S. PATENT DOCUMENTS

| | | | |
|---|---|---|---|
| 6,734,901 B1 * | 5/2004 | Kudo et al. | 348/208.4 |
| 6,778,210 B1 * | 8/2004 | Sugahara et al. | 348/208.4 |
| 7,039,307 B2 * | 5/2006 | Uchida | 396/67 |
| 7,154,541 B2 * | 12/2006 | Kondo et al. | 348/222.1 |
| 7,176,962 B2 * | 2/2007 | Ejima | 348/208.4 |
| 7,538,794 B2 * | 5/2009 | Turley et al. | 348/208.1 |
| 2003/0007076 A1 * | 1/2003 | Okisu et al. | 348/222.1 |
| 2004/0239775 A1 | 12/2004 | Washisu | |
| 2006/0182430 A1 * | 8/2006 | Stavely et al. | 396/52 |
| 2007/0024716 A1 * | 2/2007 | Yamasaki | 348/208.99 |
| 2007/0071426 A1 * | 3/2007 | Chujo et al. | 396/55 |

FOREIGN PATENT DOCUMENTS

| | | |
|---|---|---|
| JP | 9-261526 | 10/1997 |
| JP | 2001-86398 | 3/2001 |
| JP | 2003-319252 | 11/2003 |

* cited by examiner

Primary Examiner—David L Ometz
Assistant Examiner—Dwight Alex C Tejano
(74) Attorney, Agent, or Firm—Oblon, Spivak, McClelland, Maier & Neustadt, L.L.P.

(57) ABSTRACT

An image-pickup device including an image-pickup element converting an optical image of a subject into an electrical signal is provided. The image-pickup device includes a detection unit which detects brightness of the subject, a first determination unit determining an exposure-time period on the basis of the detected brightness, a second determination unit determining a divided-time period used for dividing the exposure-time period into a plurality of sections, an image-pickup-timing-control unit which divides the exposure-time period by the divided-time period, exposes the image-pickup element a plurality of times, and generates a plurality of time-division-image data items, and a combining unit which generates still-image data by combining the generated time-division-image data items with each other.

13 Claims, 7 Drawing Sheets

IMAGE-PICKUP AND ASSOCIATED METHODOLOGY OF DIVIDING AN EXPOSURE-TIME PERIOD INTO A PLURALITY OF EXPOSURES

CROSS REFERENCES TO RELATED APPLICATIONS

The present invention contains subject matter related to Japanese Patent Application JP 2005-320822 filed in the Japanese Patent Office on Nov. 4, 2005, the entire contents of which are incorporated herein by reference.

BACKGROUND OF THE INVENTION

1. Field of the Invention

The present invention relates to an image-pickup device, an image-pickup method, and a program, and particularly relates to an image-pickup device, an image-pickup method, and a program that allow for dividing an exposure-time period into a plurality of sections and making a plurality of exposures.

2. Description of the Related Art

When performing photographing through a camera, so as to obtain a still image, and when the exposure time becomes relatively long, a picked-up image is often blurred due to a camera shake even though a photographer tries to hold and keep the camera still.

A method of reducing deterioration (blur) of an image, the deterioration being caused by the above-described camera shake, is disclosed in Japanese Unexamined Patent Application Publication No. 2001-86398, for example. According to the above-described technology, the exposure-time period corresponding to the brightness of the subject is divided into a plurality of sections, where the width of each of the sections is fixed, so as to prevent an image from being affected by the camera shake, and imaging is performed a plurality of times so that a plurality of image-data items is obtained. Then, the image-data items are subjected to movement-correction processing and added to one another, so that final still-image data is generated.

SUMMARY OF THE INVENTION

According to the above-described technology disclosed in Japanese Unexamined Patent Application Publication No. 2001-86398, the exposure-time period is divided by the fixed width. Therefore, when the brightness of the subject becomes low and the exposure-time period is increased, the number of division, that is, the number of image-data items to be added to one another increases, which increases the probability of occurrence of a blurred image caused by addition of the image-data items.

More specifically, if imaging is performed while the camera shake occurs, all of images shown in picked-up images hardly match with one another even though movement correction is performed for a plurality of image-data items obtained by dividing the exposure-time period. Namely, differences to some extent between images are common. Therefore, when the exposure-time period becomes long and the number of division increases, some of the images do not agree with one another even though the image-data items are subjected to the movement correction and added to one another. As a matter of fact, a blurred image often occurs at the part corresponding to the images which do not agree with one another. Therefore, it is desirable that the division number (the number of image-data items to be added to one another) be decreased.

In a low-illuminance environment, it is difficult to obtain image data with an appropriate signal-to-noise (S/N) ratio by making a single exposure over a fixed-width time period. Therefore, even though the photographer tries to correct movement on the image data, it is difficult to correctly detect the movement on the image data under the influence of noises. Subsequently, the erroneous detection of movement often occurs.

Accordingly, the present invention allows for reducing the influence of a camera shake which occurs while photographing is performed, so as to obtain a still image, even though the exposure-time period is relatively long. The present invention further allows for reducing the image deterioration caused by combining a plurality of image-data items.

According to an embodiment of the present invention, there is provided an image-pickup device including an image-pickup element converting an optical image of a subject into an electrical signal, where the image-pickup device includes a detection unit which detects brightness of the subject, a first determination unit determining an exposure-time period on the basis of the detected brightness, a second determination unit determining a divided-time period used for dividing the exposure-time period into a plurality of sections, an image-pickup-timing-control unit that divides the exposure-time period by the divided-time period, that exposes the image-pickup element a plurality of times, and that generates a plurality of time-division-image data items, and a combining unit which generates still-image data by combining the generated time-division-image data items with each other.

The above-described image-pickup device may further include a correction unit which corrects a movement in the generated time-division-image data items, wherein the combining unit may combine the time-division-image data items subjected to the movement correction with each other and generates the still-image data.

The second determination unit may determine the divided-time period on the basis of the detected brightness.

The second determination unit may determine the divided-time period on the basis of the exposure-time period determined on the basis of the brightness by the first determination unit.

The above-described image-pickup device may further include a storing unit which stores information about a table showing the divided-time period corresponding to the exposure-time period, wherein the second determination unit may determine the divided-time period corresponding to the exposure-time period with reference to the table.

The storing unit may store information about at least one of the table corresponding to exposure-number-oriented mode, the table corresponding to divided-time-period-oriented mode, the table corresponding to mode-transition mode, and the table corresponding to curve mode.

According to another embodiment of the present invention, there is provided an image-pickup method used for an image-pickup device including an image-pickup element converting an optical image of a subject into an electrical signal. The image-pickup method includes the steps of detecting brightness of the subject, determining an exposure-time period on the basis of the detected brightness, determining a divided-time period used for dividing the exposure-time period into a plurality of sections, dividing the exposure-time period by the divided-time period, exposing the image-pickup element a plurality of times, and generating a plurality of time-division-image data items, and generating still-image data by combining the generated time-division-image data items with each other.

According to another embodiment of the present invention, there is provided a program used for controlling an image-pickup device including an image-pickup element converting an optical image of a subject into an electrical signal. The program makes a computer execute processing including the steps of detecting brightness of the subject, determining an exposure-time period on the basis of the detected brightness, determining a divided-time period used for dividing the exposure-time period into a plurality of sections, dividing the exposure-time period by the divided-time period, exposing the image-pickup element a plurality of times, and generating a plurality of time-division-image data items, and generating still-image data by combining the generated time-division-image data items with each other.

According to an embodiment of the present invention, brightness of the subject is detected, an exposure-time period is determined on the basis of the detected brightness, and a divided-time period used for dividing the exposure-time period into a plurality of sections is determined. Then, the exposure-time period is divided by the divided-time period and the image-pickup element is exposed a plurality of times, and a plurality of time-division-image data items is generated, and the generated time-division-image-data items are combined with each other, so that still-image data is generated.

According to an embodiment of the present invention, it becomes possible to reduce the influence of a camera shake while photographing is performed, so as to obtain a still image, even though an exposure-time period is relatively long. Further, according to another embodiment of the present invention, it becomes possible to reduce the image deterioration caused by combining a plurality of image-data items with each other.

DESCRIPTION OF THE PREFERRED EMBODIMENTS

Before describing embodiments of the present invention, the correspondence between the features of the claims and the specific elements disclosed in embodiments of the present invention is discussed below. This description is intended to assure that specific elements disclosed in embodiments supporting the claimed invention are described in this specification. Thus, even if an element in an embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Figure 1:
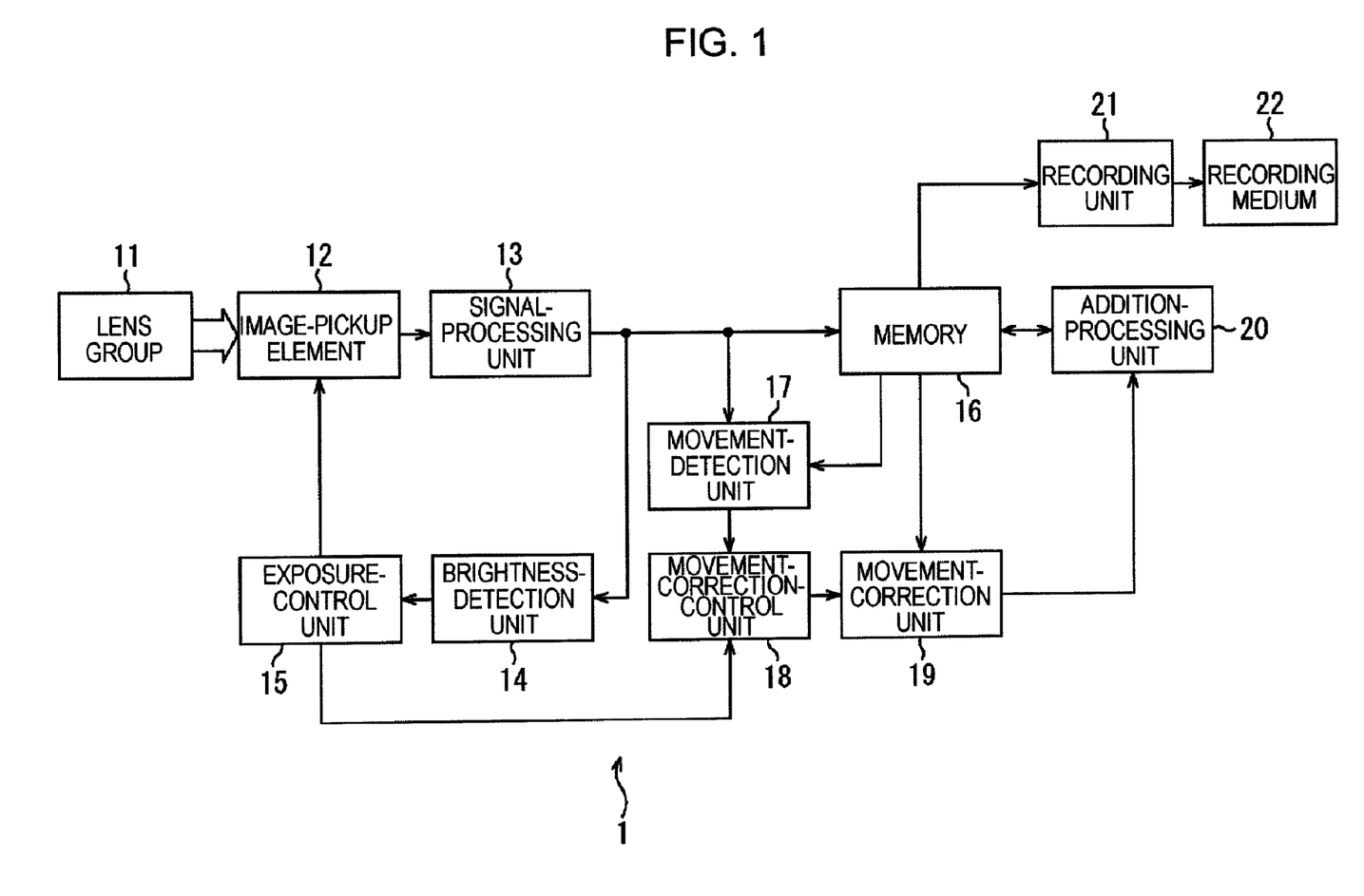
FIG. 1 is a block diagram showing an example configuration of a digital-still camera according to an embodiment of the present invention.

An image-pickup device according to an embodiment of the present invention, such as a digital-still camera 1 shown in FIG. 1, includes an image-pickup element such as an image-pickup element 12 shown in FIG. 1, where the image-pickup element converts an optical image of a subject into an electrical signal. The image-pickup device includes a detection unit detecting the brightness of the subject, such as a brightness-detection unit 14 shown in FIG. 1, a first determination unit determining an exposure-time period on the basis of the detected brightness, such as an exposure-time-period-determination unit 31 shown in FIG. 2, a second determination unit determining a divided-time period used for dividing the exposure-time period into a plurality of sections, such as a divided-time-period-determination unit 32 shown in FIG. 2, an image-pickup-timing-control unit that divides the exposure-time period by the divided-time period so that the image-pickup element is exposed a plurality of times and that generates a plurality of time-division-image data items, such as an image-pickup-timing-control unit 34 shown in FIG. 2, and a combining unit generating still-image data by combining the generated time-division-image data items with one another, such as an addition-processing unit 20 shown in FIG. 1.

The above-described image-pickup device may further include a correction unit correcting movement in the plurality of generated time-division-image data items, such as a movement-correction unit 19 shown in FIG. 1. The combining unit may combine the plurality of time-division-image data items subjected to the movement correction with one another and generate the still-image data.

Figure 2:
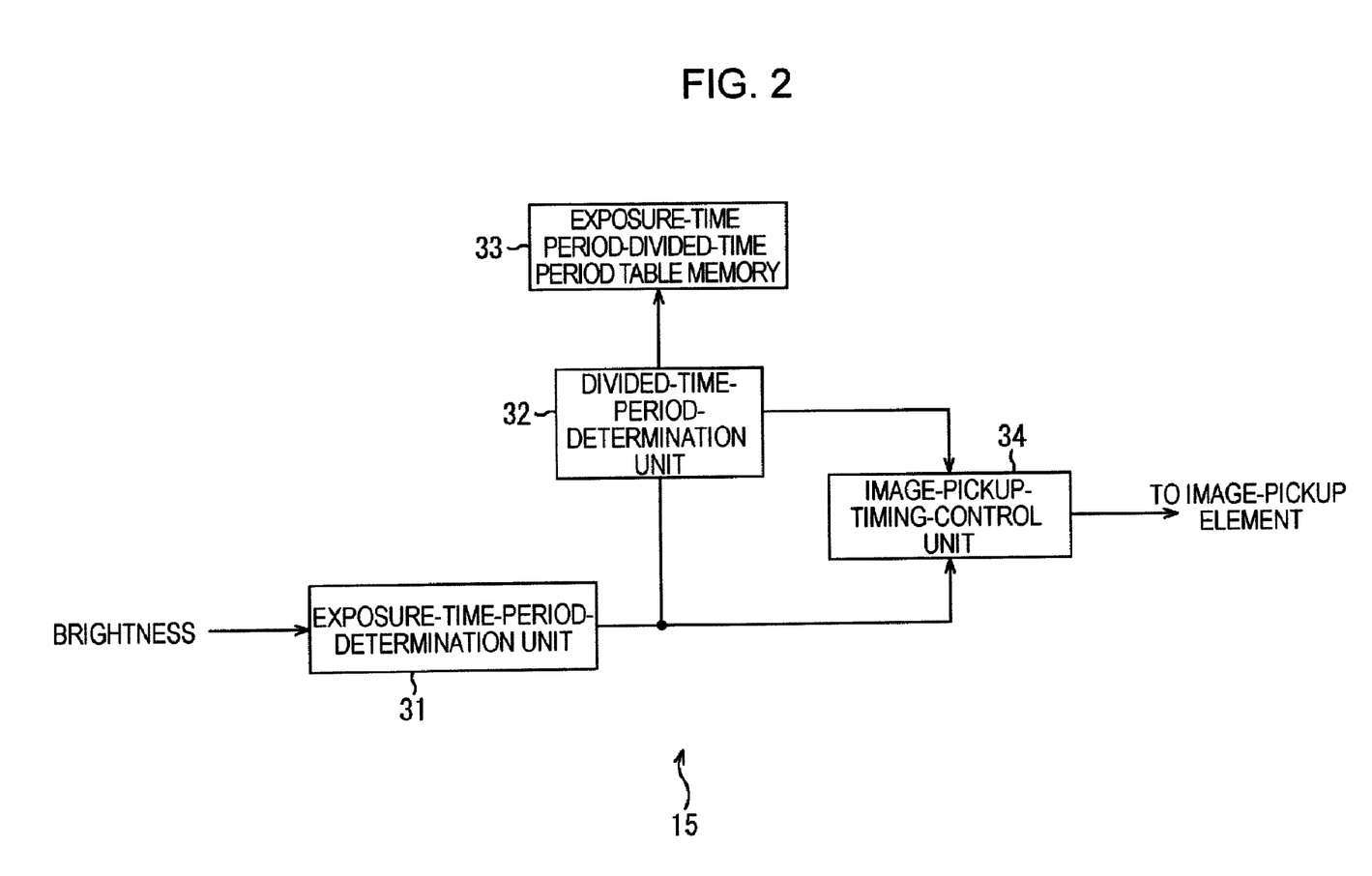
FIG. 2 is a block diagram showing an example configuration of an exposure-control unit.

The above-described image-pickup device may further include a storing unit storing information about a table indicating the divided-time period corresponding to the exposure-time period, such as an exposure-time period-divided-time period-table memory 33 shown in FIG. 2. The second determination unit can determine the divided-time period corresponding to the exposure-time period with reference to the above-described table.

An image-pickup method according to another embodiment of the present invention is used for an image-pickup device including an image-pickup element converting an optical image of a subject into an electrical signal. The above-described image-pickup method includes the steps of detecting the brightness of the subject, such as step S1 shown in FIG. 7, determining an exposure-time period on the basis of the detected brightness, such as step S2 shown in FIG. 7, determining a divided-time period used for dividing the exposure-time period into a plurality of sections, such as step S3 shown in FIG. 7, dividing the exposure-time period by the divided-time period so that the image-pickup element is exposed a plurality of times, and generating a plurality of time-division-image data items, such as step S8 shown in FIG. 7, and combining the plurality of generated time-division-image data items with one another so that still-image data is generated, such as step S11 shown in FIG. 7.

A program according to another embodiment of the present invention is provided, so as to control an image-pickup device including an image-pickup element converting an optical image of a subject into an electrical signal. The program makes a computer execute processing including the steps of detecting the brightness of the subject, such as step S1 shown in FIG. 7, determining an exposure-time period on the basis of the detected brightness, such as step S2 shown in FIG. 7, determining a divided-time period used for dividing the exposure-time period into a plurality of sections, such as step S3 shown in FIG. 7, dividing the exposure-time period by the divided-time period so that the image-pickup element is exposed a plurality of times and generating a plurality of time-division-image data items, such as step S8 shown in FIG. 7, and combining the plurality of generated time-division-image data items with one another so that still-image data is generated, such as step S11 shown in FIG. 7.

Embodiments of the present invention will be described in detail with reference to the attached drawings.

FIG. 1 shows an example configuration of a digital-still camera according to an embodiment of the present invention. When picking up a still image of a subject by using the digital-still camera 1, the exposure-time period determined on the basis of the brightness of the subject is divided into a plurality of sections and photographing is performed a plurality of times so that image-data items (hereinafter referred to as time-division-image data items) are obtained. Then, the time-division-image data items are added to one another, and a result of the addition is recorded onto a recording medium 22, as data on the still image.

The digital-still camera 1 includes a lens group 11 converging optical images of the subject onto the image-pickup element 12, the image-pickup element 12 including a charge-coupled device (CCD) and/or a complementary metal-oxide semiconductor (CMOS) converting the converged optical images into an electrical signal, for example, a signal-processing unit 13 generating a time-division-image data item on the basis of the electrical signal transmitted from the image-pickup element 12, a brightness-detection unit 14 detecting the brightness of the subject on the basis of the time-division-image data item transmitted from the signal-processing unit 13, and an exposure-control unit 15 controlling the timing of exposing the image-pickup element 12 on the basis of the detected brightness.

The digital-still camera 1 further includes a memory 16 that temporarily stores the time-division-image data item transmitted from the signal-processing unit 13 and that stores information about a result of adding a plurality of the time-division-image data items (hereinafter referred to added-image data), a movement-detection unit 17 detecting movement in the time-division-image data items transmitted from the signal-processing unit 13, a movement-correction-control unit 18 determining the amount of correction on the basis of the detected movement in the time-division-image data items and information about an exposure condition, the exposure-condition information being transmitted from the exposure-control unit 15, a movement-correction unit 19 correcting the time-division-image data items stored in the memory 16 according to the determined correction amount, an addition-processing unit 20 adding the time-division-image data items that had been subjected to the movement correction to the added-image data stored in the memory 16, a recording unit 21 that reads the added-image data stored in the memory 16 and that records the read added-image data onto the recording medium 22, and the recording medium 22 including a semiconductor memory or the like.

FIG. 2 shows an example detailed configuration of the exposure-control unit 15. The exposure-control unit 15 includes an exposure-time-period-determination unit 31 determining the exposure-time period according a known automatic-exposure-control (AE) technology on the basis of information about the brightness of the subject, the subject-brightness information being transmitted from the brightness-detection unit 14, a divided-time-period-determination unit 32 determining the divided-time period corresponding to the exposure-time period determined by the exposure-time-period-determination unit 3 with reference to information about an exposure-time period-divided-time period table, the exposure-time period-divided-time period table information being stored in an exposure-time period-divided-time period table memory 33, a mask read-only memory (ROM) and/or an electrically erasable programmable ROM (EEPROM), and so forth. The exposure-time period-divided-time period table memory 33 stores information about at least one of four types of exposure-time period-divided-time period tables, where the exposure-time period-divided-time period tables correspond to four types of modes shown in FIGS. 3, 4, 5, and 6, respectively. The exposure-control unit 15 further includes an image-pickup-timing-control unit 34 that calculates exposure number N by dividing the determined exposure-time period by the divided-time period and exposes the image-pickup element 12 over the divided-time period N time(s).

Next, the exposure-time period-divided-time period tables corresponding to the four types of modes including an exposure-number-oriented mode, a divided-time-period-oriented mode, a mode-transition mode, and a curve mode will be described, where information about the tables is stored in the exposure-time period-divided-time period-table memory 33 in advance. The user can arbitrarily set any one of the above-described modes, so as to use the mode while photographing is performed.

Figure 3:
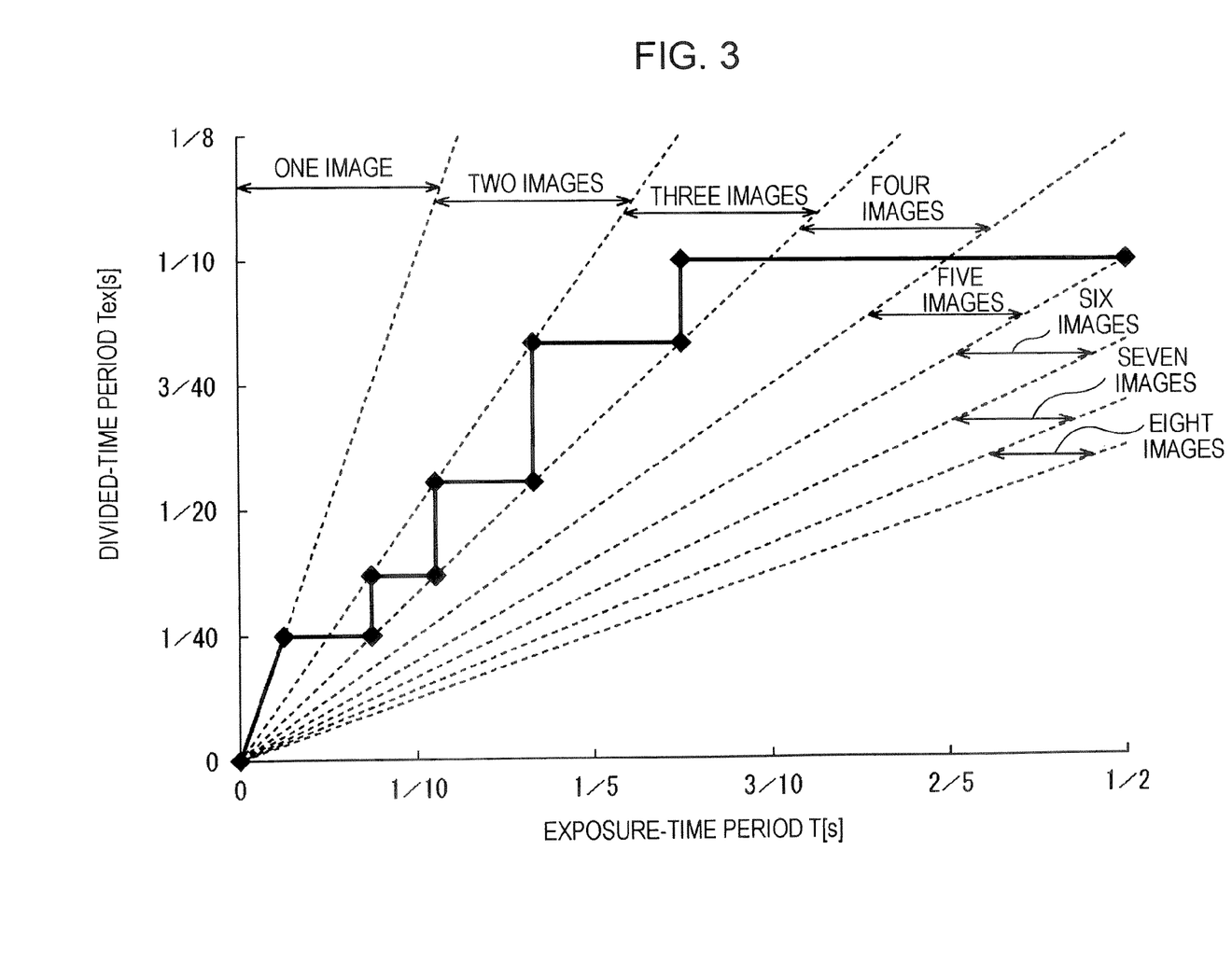
FIG. 3 shows an example of the exposure-time period-divided-time period table corresponding to exposure-number-oriented mode.

FIG. 3 shows an example exposure-time period-divided-time-period table, the exposure-time period-divided-time period table corresponding to the exposure-number (the number of image(s) to be added) mode. The correspondence between the exposure-time period and the divided-time period is shown by a solid and thick line shown in FIG. 3. The exposure-number-oriented mode is selected, so as to reduce a demerit caused by an increased number of time-division-image data items to be added so that the exposure number (the added-image number) is reduced as much as possible. However, when the exposure-time period is relatively long, the exposure number (the added-image number) has to be increased.

Figure 4:
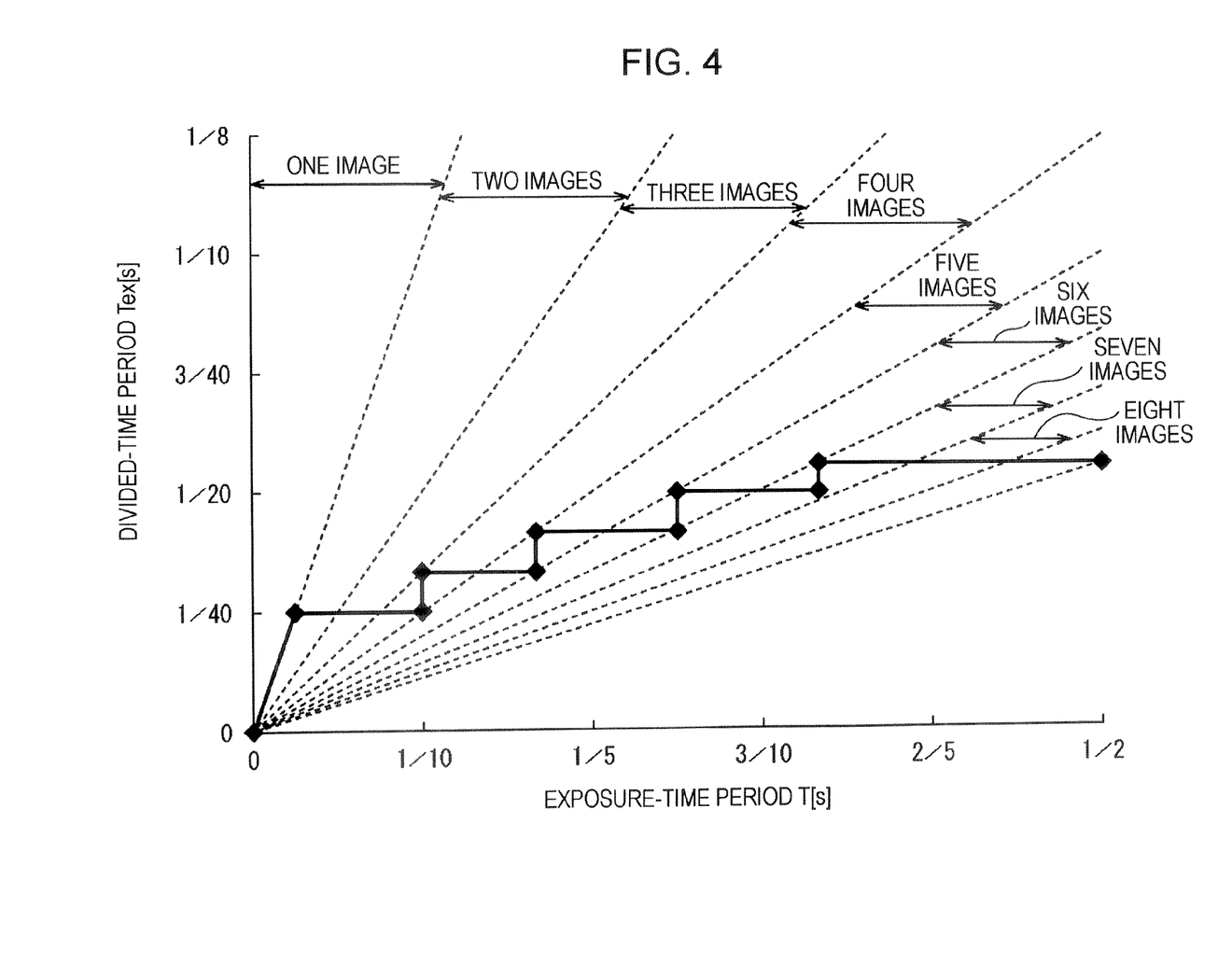
FIG. 4 shows an example of the exposure-time period-divided-time period table corresponding to divided-time-period-oriented mode.

FIG. 4 shows an example of the exposure-time period-divided-time period table corresponding to the divided-time-period-oriented mode. The correspondence between the exposure-time period and the divided-time period is indicated by a solid and thick line shown in FIG. 4. The divided-time-period oriented mode is selected so that the time period during a single exposure is made (the divided-time period) is reduced as much as possible based on the premise that a movement (blur and/or stain) in data on a time-division image to be added should be reduced as much as possible. In an example shown in FIG. 4, the first divided-time period ($1/40$) is maintained until the exposure number becomes four. Even though the exposure number becomes five or more, the length of the divided-time period is limited, so as to keep the divided-time period as short as possible.

Figure 5:
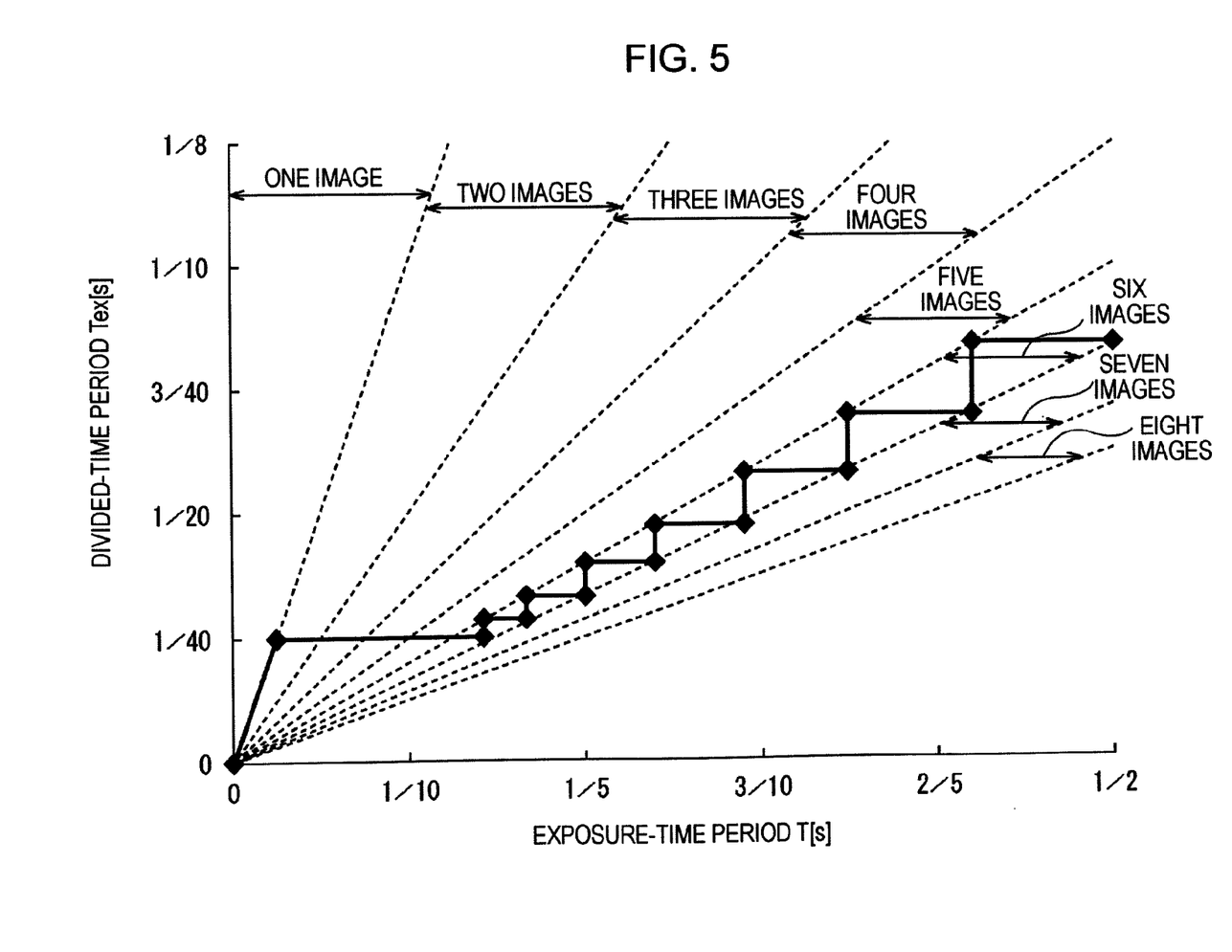
FIG. 5 shows an example of the exposure-time period-divided-time period table corresponding to mode-transition mode.

FIG. 5 shows an example exposure-time period-divided-time period table, the exposure-time period-divided-time period table corresponding to the mode-transition mode. The correspondence between the exposure-time period and the divided-time period is indicated by a solid and thick line shown in FIG. 5. According to the mode-transition mode, the time period during a single exposure is made (the divided-time period) is reduced as much as possible when the exposure-time period is relatively short, as is the case with the above-described divided-time-period-oriented mode. When the exposure-time period becomes long, the exposure number (the added-image number) is reduced as much as possible, as is the case with the exposure-number-oriented mode.

Figure 6:
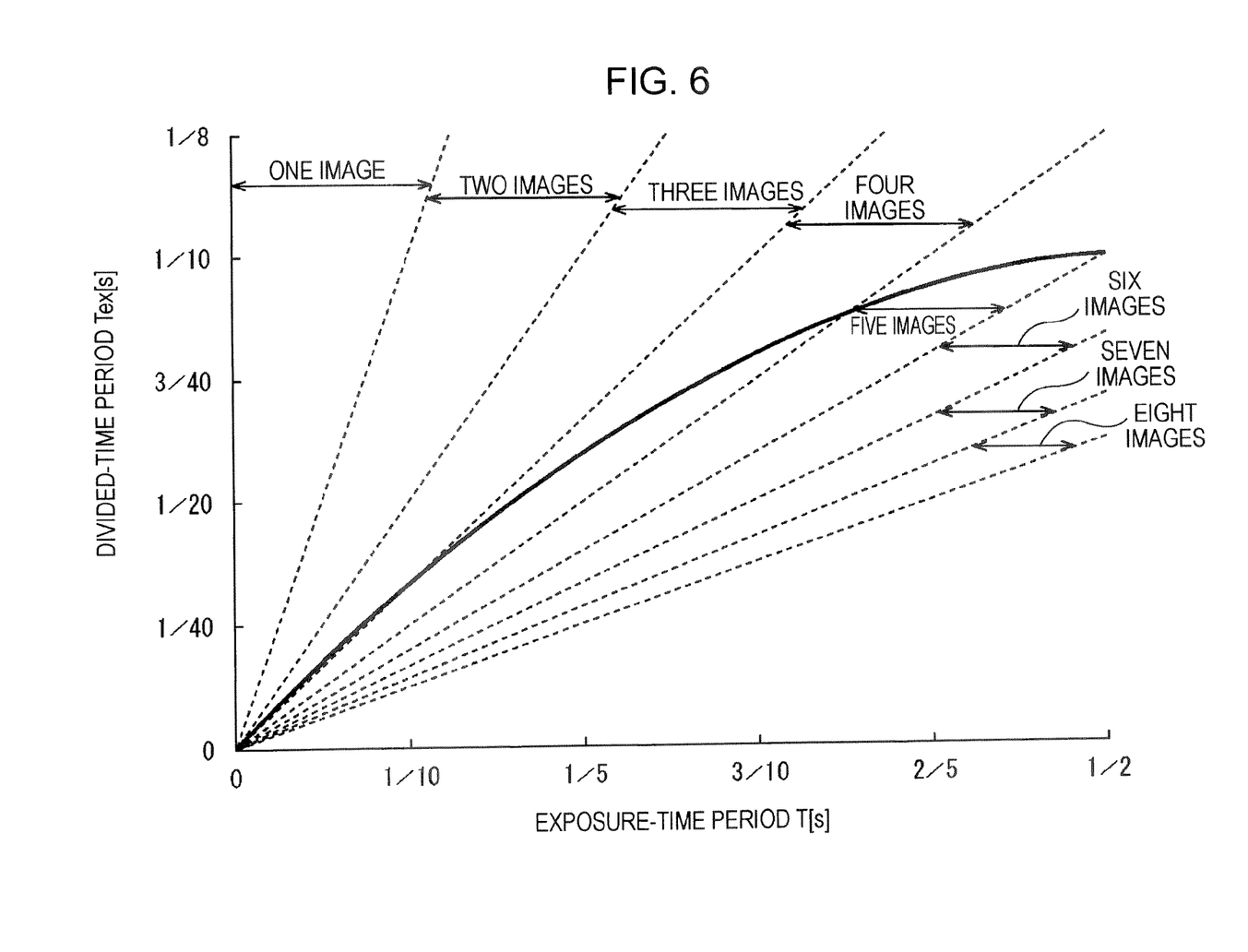
FIG. 6 shows an example of the exposure-time period-divided-time period table corresponding to curve mode.

FIG. 6 shows an example exposure-time period-divided-time period table, the exposure-time period-divided-time period table corresponding to the curve mode. The correspondence between the exposure-time period and the divided-time period is indicated by a solid and thick curve shown in FIG. 6. When the curve mode is selected, the correspondence between the exposure-time period and the divided-time period changes in a curve-like manner, which is different from the cases where the other modes are selected. That is to say, when any of the other modes is selected, the above-described correspondence changes in a step-like manner.

The exposure-time period-divided-time period table corresponding to any of the above-described modes is generated on the basis of the result of an experiment. According to any of the exposure-time period-divided-time period tables, the divided-time period is short enough to reduce the occurrence of the camera shake and an appropriate signal-to-noise (S/N) ratio can be attained irrespective of the value of the exposure-time period.

Figure 7:
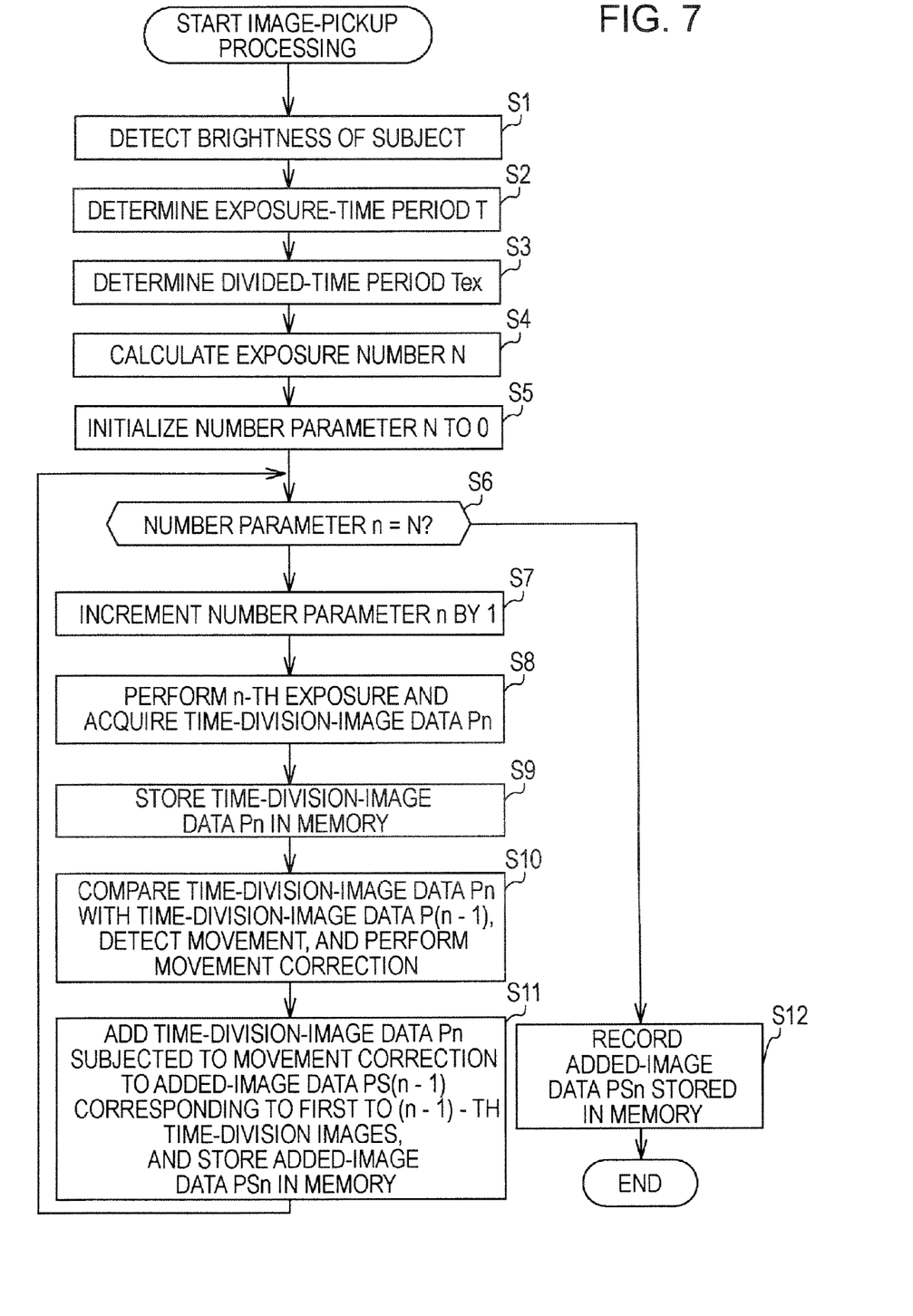
FIG. 7 is a flowchart illustrating image-pickup processing performed by the digital-still camera shown in FIG. 1.

Next, image-pickup processing performed by the digital-still camera 1 will be described with reference to a flowchart shown in FIG. 7. The above-described image-pickup processing is started when the user presses down a shutter button (not shown) of the digital-still camera 1, for example. Here, the mode corresponding to the exposure-time period-divided-time period table referred to by the divided-time-period-determination unit 32 is selected in advance. Further, the lens group 11, the image-pickup element 12, and the signal-processing unit 13 had already started operating. Still further, the signal-processing unit 13 had already started transmitting image data used for detecting the brightness to the brightness-detection unit 14 at predetermined intervals.

At step S1, the brightness-detection unit 14 detects the brightness of the subject on the basis of the image data transmitted from the signal-processing unit 13 and transmits information about the detected brightness to the exposure-control unit 15. At step S2, the exposure-time-period-determination unit 31 of the exposure-control unit 15 determines an exposure-time period T on the basis of the brightness information transmitted from the brightness-detection unit 14 and notifies the divided-time-period-determination unit 32 and the image-pickup-timing-control unit 34 of the determined exposure-time period T.

At step S3, the divided-time-period-determination unit 32 refers to the exposure-time period-divided-time period table that is stored in the exposure-time period-divided-time period-table memory 33 and that corresponds to the mode selected by the user so that the divided-time period Tex corresponding to the exposure-time period T determined by the exposure-time-period-determination unit 31 is determined. Further, the divided-time-period-determination unit 32 notifies the image-pickup-timing-control unit 34 of the divided-time period Tex.

At step S4, the image-pickup-timing-control unit 34 divides the exposure-time period T by the divided-time period Tex, calculates the image-pickup number N by rounding off the division result. Further, at step S5, the image-pickup-timing-control unit 34 initializes the value of number parameter n to zero.

At step S6, the image-pickup-timing-control unit 34 determines whether or not the value of the number parameter n is the same as that of the image-pickup number N. If the image-pickup-timing-control unit 34 determines that the value of the number parameter n is not the same as that of the image-pickup number N, the processing advances to step S7.

At step S7, the image-pickup-timing-control unit 34 increments the number parameter n by one. At step S8, the image-pickup-timing-control unit 34 controls the image-pickup element 12 so that the image-pickup element 12 makes an exposure over the divided-time period Tex, so as to perform photographing and obtain the n-th time-division-image data Pn. Under the control of the image-pickup-timing-control unit 34, the image-pickup element 12 transmits an electrical signal to the signal-processing unit 13, the electrical signal being obtained through the exposure made over the divided-time period Tex. The signal-processing unit 13 generates the time-division-image data Pn obtained by making the n-th exposure and transmits the time-division-image data Pn to the memory 16 and the movement-detection unit 17.

Further, the last and N-th exposure is made over the divided-time period Tex. This is because that when the last and N-th exposure is made over a time period shorter than the divided-time period Tex (T−(N−1)·Tex), so as to make the time period during the last and N-th exposure is made agree with the exposure-time period, it becomes difficult to attain a time-division image with a high S/N ratio. If the last and N-th exposure is made to excess, the addition-processing unit 20 provided in the post stage performs gain control, so as to compensate for the above-described excessive exposure.

At step S9, the memory 16 stores the time-division-image data Pn transmitted from the signal-processing unit 13 and transmits time-division-image data P(n−1) that had been stored in the memory 16 to the movement-detection unit 17, the time-division-image data P(n−1) corresponding to the next previous time-division image. At step S10, the movement-detection unit 17 compares the transmitted time-division-image data P(n−1) with the time-division-image data Pn, so as to detect the movement of the subject image shown on the time-division-image data Pn transmitted from the signal-processing unit 13, and notifies the movement-correction-control unit 18 of the detection result. The movement-correction-control unit 18 determines the amount of movement correction on the basis of the notified detection result and the exposure-condition information (information about the exposure-time period T, the divided-time period Tex, and so forth) transmitted from the exposure-control unit 15, and notifies the movement-correction unit 19 of the determined movement-correction amount. According to the notification, the movement-correction unit 19 reads the time-division-image data Pn from the memory 16, performs the movement correction, and outputs time-division-image data P'n obtained, as a result of the movement correction, to the addition-processing unit 20.

At step S11, the addition-processing unit 20 reads added-image data PS(n−1) from the memory 16, where the added-image data PS(n−1) includes time-division-image data P1 up to time-division-image data P' (n−1) that are added to one another, where the time-division-image data P1 corresponds to the first time-division image and the time-division-image data P' (n−1) corresponds to the (n−1)-th time-division image that had been subjected to the movement correction. Then, the addition-processing unit 20 adds the time-division-image data P'n that is transmitted from the movement-correction unit 19 and that had been subjected to the movement correction to the added-image data PS(n−1). After that, the addition-processing unit 20 makes the memory 16 store added-image data PSn obtained, as a result of the above-described addition.

Here, the time-division-image data P1 corresponding to the first time-division image, the time-division-image data P1 being transmitted from the signal-processing unit 13, is not subjected to the movement correction. Further, added-image data is not added to the time-division-image data P1, where the added-image data corresponds to time-division images up to a time-division image immediately preceding the first time-division image.

After that, the processing returns to step S6 so that the processing from then on is performed again. Then, if it is determined that the value of the number parameter n is the same as that of the photographing number N, at step S6, the processing advances to step S12.

At step S12, the recording unit 21 records added-image data PSN stored in the memory 16 onto the recording medium 22, as data on a still image obtained through the latest photographing, where the added-image data PSN includes the first time-division-image data P1 up to the N-th time-division-image data P'N that are added to one another. Here, the first time-division-image data P1 corresponds to the first time-division image and the N-th time-division-image data P'N corresponds to the N-th time-division image that had been subjected to the movement correction.

After that, the image-pickup processing is finished, and the digital-still camera 1 waits until the shutter button is pressed down again.

Further, the processing performed, so as to correct the movement in the time-division-image data, at step S10, may not be performed according to settings made by the user.

Thus, the digital-still camera 1 according to an embodiment of the present invention performs the image-pickup processing, so as to determine the divided-time period appropriate in a low-illuminance environment where an exposure should be made over a long time period. Subsequently, the digital-still camera 1 can minimize a blurred image caused by adding the time-division-image data, reduce an erroneously detected movement caused by a noise while the movement detection is performed, and obtain an image with a minimum blur.

Further, the digital-still camera 1 divides the exposure-time period required to perform photographing by the divided-time period and makes an exposure, as described above. Subsequently, a blurred image included in signals obtained during a single exposure-time period becomes smaller than in the case where the exposure-time period is not divided. The deterioration of the S/N ratio, the deterioration occurring due to the reduction of the exposure-time period, can be compensated by adding signals.

Further, the lower the illuminance becomes, the longer the divided-time period becomes so that the S/N ratio does not deteriorate, which makes it possible to decrease erroneous detection caused by a noise. Further, in the low-illuminance environment, a required exposure-time period becomes long. However, since the divided-time period also becomes long, the added-image number of the time-division-image data does not increase in proportion to the required exposure-time period. Therefore, it becomes possible to reduce an image blur caused by the addition.

The above-described series of processing can be executed not only by hardware but also by software. For executing the series of processing by software, a program included in the software is installed from a recording medium in a computer mounted inside dedicated-purpose hardware, or in a general personal computer or the like, which can execute various functions by using various programs installed therein.

The program is stored in the recording medium and supplied to the personal computer. Then, the program is loaded into a RAM according to an instruction issued by a CPU, the instruction corresponding to a command transmitted from the user, and executed.

Further, in this specification, steps executed on the basis of the program include not only processing executed in time sequence according to the written order but also processing that is not necessarily executed in time sequence but can be executed in parallel and/or separately.

Further, the program may be executed by a single computer and executed by a plurality of computers in a distributed manner. Still further, the program may be transferred to a computer in a remote location and executed.

It should be understood by those skilled in the art that various modifications, combinations, sub-combinations and alterations may occur depending on design requirements and other factors insofar as they are within the scope of the appended claims or the equivalents thereof.

What is claimed is:

1. An image-pickup device including an image-pickup element converting an optical image of a subject into an electrical signal, the image-pickup device comprising:
   detection means which detects brightness of the subject;
   first determination means determining an exposure-time period on the basis of the detected brightness;
   second determination means determining a divided-time period used for dividing the exposure-time period into a plurality of exposures;
   image-pickup-timing-control means which divides the exposure-time period by the divided-time period, exposes the image-pickup element for the divided-time period for each exposure except for one of the exposures which is extended in time to include a portion of the exposure-time period resulting from a remainder from the division of the exposure-time period by the divided-time period, and generates a plurality of time-division-image data items from the exposures; and
   combining means which generates still-image data by combining the generated time-division-image data items with each other.

2. The image-pickup device according to claim 1, further comprising:
   correction means which corrects a movement in the generated time-division-image data items by determining a movement in a second time-division-image data item from a second exposure by comparing the second time-division-image data item to a first time-division-image data item from a first exposure, correcting the second time-division-image data item based on the comparison with the first time-division-image data item, determining a movement in a third time-division-image data item from a third exposure by comparing the third time-division-image data item to the corrected second time-division-image data item and correcting the third time-division-image data item based on the comparison with the corrected second time-division-image data item, the first, second and third exposures being consecutive exposures of the image-pickup element, wherein
   the correcting the second time-division-image data item is performed prior to performing the third exposure, and
   the combining means combines the time-division-image data items subjected to the movement correction with each other and generates the still-image data by adding the corrected second time-division-image data item to the first time-division-image data item prior to performing the third exposure.

3. The image-pickup device according to claim 1, wherein the second determination means determines the divided-time period on the basis of the detected brightness.

4. The image-pickup device according to claim 1, wherein the second determination means determines the divided-time period on the basis of the exposure-time period determined on the basis of the brightness by the first determination means.

5. The image-pickup device according to claim 1, further comprising storing means which stores information about a table showing the divided-time period corresponding to the exposure-time period,
  wherein the second determination means determines the divided-time period corresponding to the exposure-time period with reference to the table.

6. The image-pickup device according to claim 5, wherein the storing means stores information about at least one of the table corresponding to an exposure-number-oriented mode, a table corresponding to a divided-time-period-oriented mode, a table corresponding to a mode-transition mode, and a table corresponding to a curve mode.

7. An image-pickup method used for an image-pickup device including an image-pickup element converting an optical image of a subject into an electrical signal, the image-pickup method comprising the steps of:
  detecting brightness of the subject;
  determining an exposure-time period on the basis of the detected brightness;
  determining a divided-time period used for dividing the exposure-time period into a plurality of exposures;
  dividing the exposure-time period by the divided-time period;
  exposing the image-pickup element for the divided-time period for each exposure except for one of the exposures which is extended in time to include a portion of the exposure-time period resulting from a remainder from the division of the exposure-time period by the divided-time period;
  generating a plurality of time-division-image data items from the exposures; and
  generating still-image data by combining the generated time-division-image data items with each other.

8. A non-transitory computer readable medium including computer executable instructions, wherein the instructions, when executed by a processor, cause the processor to perform a method of controlling an image-pickup device including an image-pickup element converting an optical image of a subject into an electrical signal, the method comprising the steps of:
  detecting brightness of the subject;
  determining an exposure-time period on the basis of the detected brightness;
  determining a divided-time period used for dividing the exposure-time period into a plurality of sections;
  dividing the exposure-time period by the divided-time period;
  exposing the image-pickup element for the divided-time period for each exposure except for one of the exposures which is extended in time to include a portion of the exposure-time period resulting from a remainder from the division of the exposure-time period by the divided-time period;
  generating a plurality of time-division-image data items from the exposures; and
  generating still-image data by combining the generated time-division-image data items with each other.

9. An image-pickup device including an image-pickup element converting an optical image of a subject into an electrical signal, the image-pickup device comprising:
  a detection unit which detects brightness of the subject;
  a first determination unit determining an exposure-time period on the basis of the detected brightness;
  a second determination unit determining a divided-time period used for dividing the exposure-time period into a plurality of sections;
  an image-pickup-timing-control unit which divides the exposure-time period by the divided-time period, exposes the image-pickup element for the divided-time period for each exposure except for one of the exposures which is extended in time to include a portion of the exposure-time period resulting from a remainder from the division of the exposure-time period by the divided-time period, and generates a plurality of time-division-image data items from the exposures; and
  a combining unit which generates still-image data by combining the generated time-division-image data items with each other.

10. The image-pickup device according to claim 1, wherein the combining means generates the still-image data by reducing a gain of the generated time-division-image data item generated from the extended exposure, prior to combining the generated time-division-image data items with each other, to compensate for the extended time of the extended exposure.

11. The image-pickup method according to claim 7, wherein the generating still-image data includes reducing a gain of the generated time-division-image data item generated from the extended exposure, prior to combining the generated time-division-image data items with each other, to compensate for the extended time of the extended exposure.

12. The computer readable medium according to claim 8, wherein the generating still-image data includes reducing a gain of the generated time-division-image data item generated from the extended exposure, prior to combining the generated time-division-image data items with each other, to compensate for the extended time of the extended exposure.

13. The image-pickup device according to claim 9, wherein the combining unit generates the still-image data by reducing a gain of the time-division-image data item generated from the extended exposure, prior to combining the generated time-division-image data items with each other, to compensate for the extended time of the extended exposure.

* * * * *